US007760363B2

(12) United States Patent
Chen et al.

(10) Patent No.: US 7,760,363 B2
(45) Date of Patent: Jul. 20, 2010

(54) METHOD AND APPARATUS FOR SIMULTANEOUSLY ACQUIRING INTERFEROGRAMS AND METHOD FOR SOLVING THE PHASE INFORMATION

(75) Inventors: Liang-Chia Chen, Taipei County (TW); Sheng-Lih Yeh, Taipei (TW); Huang-Wen Lai, Taipei County (TW)

(73) Assignee: National Taipei University of Technology, Taipei (TW)

( * ) Notice: Subject to any disclaimer, the term of this patent is extended or adjusted under 35 U.S.C. 154(b) by 393 days.

(21) Appl. No.: 11/949,202

(22) Filed: Dec. 3, 2007

(65) Prior Publication Data
US 2008/0285048 A1 Nov. 20, 2008

(30) Foreign Application Priority Data
May 18, 2007 (TW) .............................. 96117709 A

(51) Int. Cl.
*G01B 9/02* (2006.01)
(52) U.S. Cl. ...................................................... 356/491
(58) Field of Classification Search ......... 356/491–493, 356/453, 487, 495
See application file for complete search history.

(56) References Cited

U.S. PATENT DOCUMENTS

| 4,693,605 | A | * | 9/1987 | Sommargren | ............... | 356/487 |
|---|---|---|---|---|---|---|
| 5,949,546 | A | * | 9/1999 | Lee et al. | .................... | 356/492 |
| 6,020,963 | A | * | 2/2000 | DiMarzio | ................... | 356/491 |
| 6,268,923 | B1 | | 7/2001 | Michniewicz et al. | | |
| 6,304,330 | B1 | | 10/2001 | Millerd et al. | | |
| 6,552,808 | B2 | | 4/2003 | Millerd et al. | | |
| 7,212,290 | B2 | * | 5/2007 | Fine et al | .................... | 356/495 |
| 7,511,827 | B2 | * | 3/2009 | Kawasaki et al. | ........... | 356/512 |
| 2001/0035961 | A1 | | 11/2001 | Mitsutani et al. | | |
| 2006/0039007 | A1 | * | 2/2006 | Kim et al. | ................... | 356/495 |

FOREIGN PATENT DOCUMENTS

DE 19652113 6/1998

* cited by examiner

*Primary Examiner*—Michael A Lyons
(74) *Attorney, Agent, or Firm*—WPAT, PC; Justin King

(57) ABSTRACT

A method and apparatus for simultaneously acquiring interferograms created with a plurality of different interference conditions are provided in the present invention. In the present invention, an object beam and a reference beam are used to interfere with each other and there are a plurality of sub-fields of interference simultaneously generated. All the sub-fields of interference can be simultaneously acquired by an image acquiring device with single shooting action so as to form the plurality of interferograms. Moreover, the present invention also provides a method for solving the phase information of the object beam from the interferograms formed by the foregoing said method.

20 Claims, 14 Drawing Sheets

METHOD AND APPARATUS FOR SIMULTANEOUSLY ACQUIRING INTERFEROGRAMS AND METHOD FOR SOLVING THE PHASE INFORMATION

FIELD OF THE INVENTION

The present invention relates to a method and an apparatus for simultaneously acquiring interferograms in a real-time manner as well as the method for analyzing the phase information of the object measured from the so-acquired interferograms, and more particularly, to enable an object beam and a reference beam to interfere with each other under various interference conditions so as to generate a plurality of interferograms in real time accordingly, thereby, a method can be provided for using the values of light intensity in those phase-shifted interferograms to analyze and solve phase information relating to an object measured.

BACKGROUND OF THE INVENTION

As many physical properties of objects can be measured accurately and non-contactly by optical measuring technologies, optical measuring methods are frequently used for measuring surface features in industries, such as wafer manufacturing, semi-conductor manufacturing, liquid crystal display manufacturing, electro-mechanical automation engineering, electro-optical measurements, and so on. Namely, optical measuring methods are adapted for measuring surface roughness and flatness of a wafer, for measuring bump sizes and coplanarity in a flip-chip manufacturing process, for measuring sizes of a space used for an LCD's color filter, or for measuring surface characteristics of a microstructure, etc.

There are many optical measurement techniques currently available, including phase-shifting interferometry, white-light interferometry, and confocal microscopy, etc. They are designed for different measurement conditions/environments and for different applications. The conventional phase-shifting interferometry is a technique about the interference of two light beams, i.e. an object beam and a reference beam, with different optical paths. According to the fringes interfered by the two light beams, the phase distribution of the object beam can be precisely calculated with different phase differences caused by different phase-shifts, then the phase information of the object beam can be precisely calculated. The principle of white-light interferometry is that: the maximal interference intensity occurs when the optical path difference for an object beam and a reference beam for all wavelengths is zero, so the plane with the zero optical-path difference can intersect the surface of an object to show the contours with the same height, then by vertically scanning, the height distribution of the object surface can be derived by combining many different equal-height contours. The confocal microscopy is an imaging technique used to measure a three-dimensional (3D) image by using a spatial pinhole to eliminate out-of-focus light. All the abovementioned methods are common in that: they all need to compare and analyze interference images acquired in sequence so as to reconstruct the 3D profile of an object. However, as those interference images acquired in sequence can be easily affected by vibration caused by surrounding environments, inaccurate measurements can be resulted if so.

U.S. Pat. No. 6,268,923 discloses an optical method and an optical system for measuring the 3D surface of an object. The optical method first splits a light beam emitted from a light source into three reference beams while varying the optical paths of the three reference light beam by manners such as shifting the position of a reference mirror in the optical system, varying the thickness of a glass plate used in the optical system, or changing the tilt angle of the reference mirror, and so on, so as to achieve the phase-shifting of the three reference beams simultaneously, and then the three reference beams are respectively directed to interfere with an object beam for enabling three different image sensors to acquire three interferograms simultaneously.

U.S. Publ. No. 2001/0035961 discloses a shape measuring apparatus, by which a reference beam and an object beam are directed to a quarter-wave plate to form a left-circular polarized beam and a right-circular polarized beam respectively, and the two polarized beams are split respectively toward three polarizers with different polarizing directions so as to form three interference images with different phase shifts while the three interference fringe images are detected by a single image sensor simultaneously.

In addition, each of two U.S. Pat. Nos. 6,304,330 and 6,552,808 reveals a method and apparatus for splitting, imaging and measuring wavefronts with interferometry. Each of the two abovementioned U.S. patents directs a 45-degree linearly polarized reference beam and a 45-degree linearly polarized object beam to a quarter-wave plate so as to form respectively a left-circular polarized beam and a right-circular polarized beam. Then direct the polarized beams to a phase-shifting array for generating four interferograms with different phase shifts and then taking the images of the four interferograms by a single image sensor simultaneously.

Moreover, Germany Pat. No. 19,652,113 discloses an improved Michelson interferometry apparatus, by which three interferograms with different phase shifts can be captured by a single image sensor simultaneously. In the optical apparatus, a reference beam is diffractively split into three beams with the same polarization by a grating, including the $-1^{th}$-order, 0th-order, and $1^{th}$-order diffraction beams, in which the three diffraction beams are further directed to pass through a quarter-wave plate to create different phase delays. Finally, the three beams are combined and pass through a polarizer to form three different phase shifts for creating three interferograms with an object beam.

SUMMARY OF THE INVENTION

The purpose of the present invention is to provide a method and apparatus for simultaneously acquiring interferograms in a real-time manner, using optical elements arranged in the apparatus, a plurality of interferograms generated from the interference of an object beam and a reference beam under various interference conditions can be obtained and used for realizing online real-time measurements while achieving the purposes of avoiding vibration disturbance, saving measurement time, and reducing measurement costs. Moreover, by integrating the aforesaid apparatus with objectives of different magnification powers, the analyzing ability of the aforesaid apparatus can cover sizes of micrometer orders.

Another purpose of the invention is to provide a method for simultaneously analyzing the phase information of the plural interferograms acquired by the aforesaid apparatus and method, by which phase information relating to an object to be measured can be analyzed and solved.

To achieve the above purposes, the present invention provides a method for simultaneously generating and acquiring interferograms in a real-time manner, which comprises the steps of: polarizing a measuring beam into a polarized beam; splitting the polarized beam into a first polarized beam and a second polarized beam; forming a reference beam by the use of the first polarized beam; projecting the second polarized beam on an object measured for forming an object beam; interfering the object beam with the reference beam so as to form at least two interference fields while enabling the phase differences between the object beam and the reference beam of the at least two interference fields to be different from each other; dividing the at least two interference fields into a plurality of sub-fields of interference; and using an image acquiring device to image the plural sub-fields in a single shooting action for acquiring a plurality of interferograms accordingly.

Moreover, the present invention provides an apparatus for simultaneously generating and acquiring interferograms in a real-time manner, which comprises: a light emitting unit, for emitting a measuring beam; a polarizing unit, for polarizing the measuring beam into a polarized beam; an optical module, for splitting the polarized beam into a first polarized beam and a second polarized beam while enabling the first polarized beam to form a reference beam and the second polarized beam to project on an object measured so as to form an object beam, and thus to interfere the object beam with the reference beam for forming at least two interference fields as the object and reference beams are split by the optical module while enabling the phase differences between the object beam and the reference beam of the at least two interference fields to be different from each other; a polarization beam splitting unit, for receiving the at least two interference fields so as to divide the at least two interference fields into a plurality of sub-fields of interference; and an image acquiring unit, for imaging the plural sub-fields in a single shooting action for acquiring a plurality of interferograms accordingly.

In addition, the present invention further provides a method for analyzing the phase information of the object beam from the interferograms, which comprises the steps of: using an apparatus capable of simultaneously generating and acquiring interferograms created by an object beam and a reference beam so as to simultaneously generate four sub-fields of interference; determining a P-wave constant $C_p$ and an S-wave constant $C_s$ of the aforesaid apparatus; determining three optical constants of the aforesaid apparatus, i.e. $R_1$, $R_2$, and $R_3$; and using the values of the intensity of the four sub-fields of interference, the P-wave constant $C_p$, the S-wave constant $C_s$, and the three optical constants $R_1$, $R_2$, and $R_3$ to solve the phase information of the object beam.

Further scope of applicability of the present invention will become more apparent from the detailed description given hereinafter. However, it should be understood that the detailed description and specific examples, while indicating preferred embodiments of the invention, are given by the way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings given by the way of illustration only, and thus are not limitative of the present invention and wherein.

DESCRIPTION OF THE EXEMPLARY EMBODIMENTS

Figure 1:
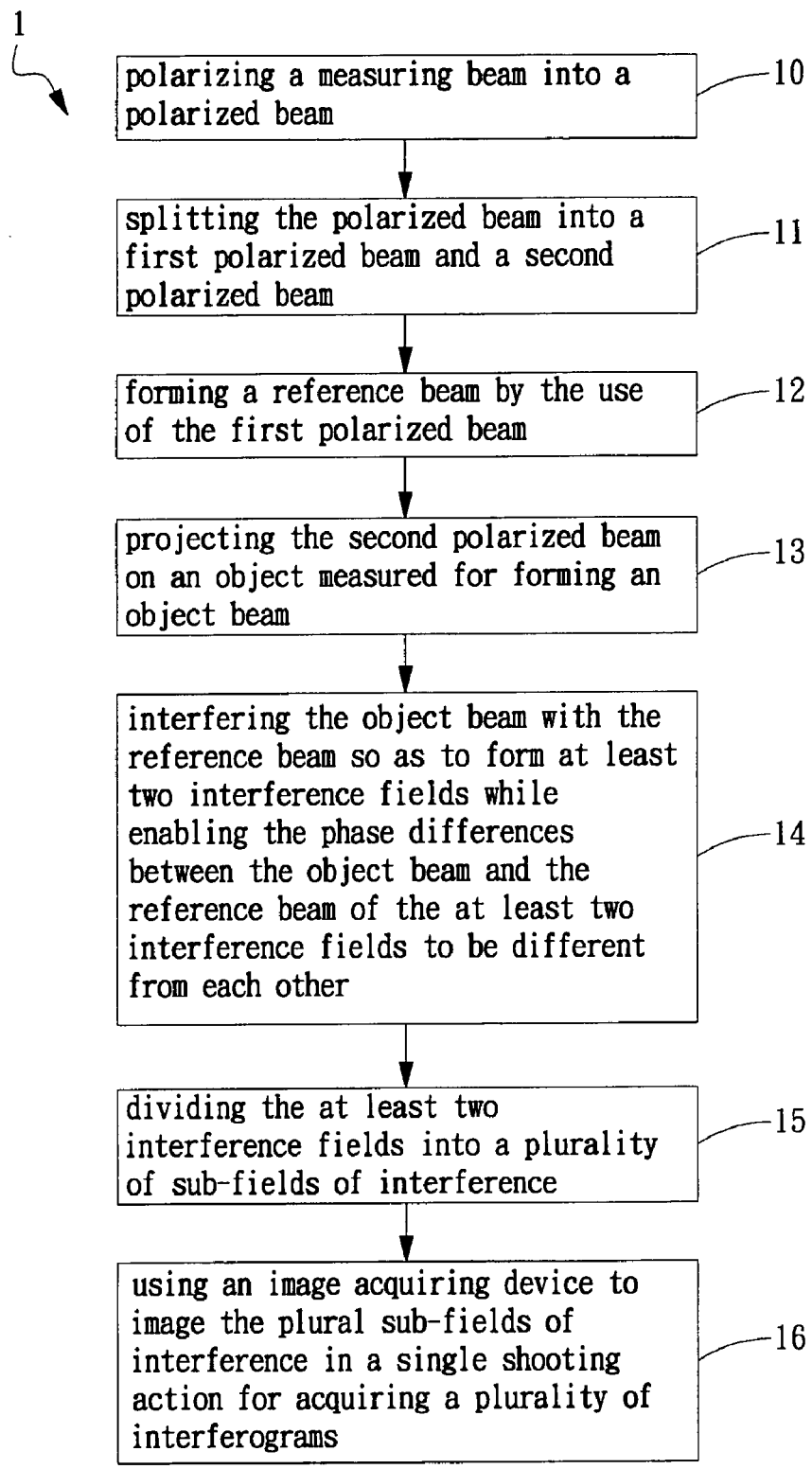
FIG. 1 is a flow chart showing steps of a method for simultaneously generating and acquiring interferograms according to an exemplary embodiment of the invention.

For your esteemed members of reviewing committee to further understand and recognize the fulfilled functions and structural characteristics of the invention, several exemplary embodiments with detailed description are presented as the follows Please refer to FIG. 1, which is a flow chart showing steps of a method for simultaneously generating and acquiring interferograms according to an exemplary embodiment of the invention. The flow starts from step 10. At step 10, a measuring beam provided by a light emitting unit is polarized into a polarized beam, and then the flow proceeds to step 11. At step 11, the polarized beam is non-polarization split into a first polarized beam and a second polarized beam, and then the flow proceeds to step 12.

At step 12, the first polarized beam is transformed and used as a reference beam, and then the flow proceeds to step 13. At step 13, the second polarized beam is projected on an object measured to form an object beam, and then the flow proceeds to step 14. It is noted that the object beam can be formed either by the reflection of the second polarized beam from the object or by the refraction of the second polarized beams through the object. At step 14, by the interference of the object beam and the reference beam, at least two interference fields are generated while enabling the phase differences between the object beam and the reference beam of the at least two interference fields to be different from each other, and then the flow proceeds to step 15. At step 15, the at least two interference fields are divided into a plurality of sub-fields of interference, and then the flow proceeds to step 16. At step 16, an image acquiring device is provided so as to be used for imaging the plural sub-fields in a single shooting action for acquiring a plurality of interferograms accordingly. It is noted that the plural interferograms are composed of interference fringes caused by the interference between the reference beam and the object beam under different interference conditions.

Moreover, in order to realize the aforesaid method, it is required to have an apparatus for simultaneously generating and acquiring interferograms. Please refer to FIG. 2, which is a schematic view of an apparatus for simultaneously generating and acquiring interferograms according to a first exemplary embodiment of the invention. The apparatus 2 in FIG. 2 comprises: a light emitting unit 20; a polarizing unit 21; an optical module 22; a polarization beam splitting unit 23 and an image acquiring unit 24. The light emitting unit 20 is a light source emitting a measuring beam 80. The polarizing unit 21 is used for polarizing the measuring beam 80 into a polarized beam 81. If the measuring beam 80 emitted from the light emitting unit 20 is a divergent wave, a light collimating unit 27 is required and disposed at a position between the polarizing unit 21 and the light emitting unit 20 so as to transform the measuring beam 80 into a plane wave. As the polarizing unit 21 is used for polarizing the measuring beam 80 into a polarized beam 81, in this exemplary embodiment, the polarized beam 81 is a linearly polarized beam whose polarization direction forms an angle of 45 degrees with respect to the normal of the FIG. 2's viewing plane. However, it is not limited thereby.

Figure 2:
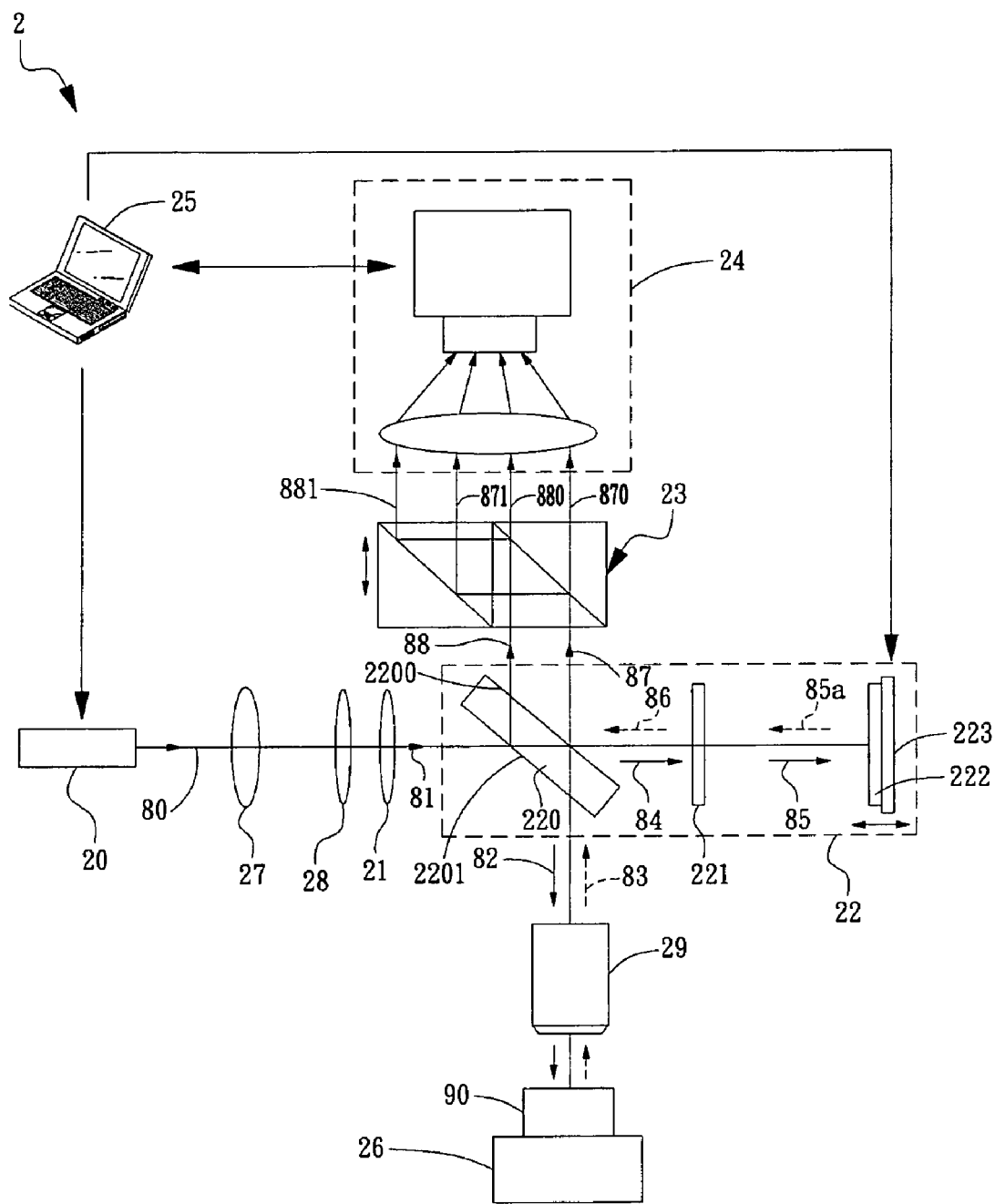
FIG. 2 is a schematic view of an apparatus for simultaneously generating and acquiring interferograms according to a first exemplary embodiment of the invention.

For adjusting light intensity, a light intensity adjusting unit 28 can be disposed at a position between the polarizing unit 21 and the light collimating unit 27 in the apparatus 2, as the embodiment shown in FIG. 2, to make the interferograms to be imaged clearly. It is noted that the position of the light intensity unit 28 can be varied as required that it is not limited by the aforesaid embodiment. For instance, the light intensity adjusting unit 28 can be placed in the path of the reference beam or the object beam. The optical module 22 is used for splitting the polarizing beam 81 into a first polarized beam 84 and a second polarized beam 82 while enabling the first polarized beam 84 to form a reference beam 86 and the second polarized beam 82 to be projected on an object 90 measured so as to form an object beam 83, and thus to interfere the object beam 83 with the reference beam 86 for forming at least two interference fields, as the two fields 87 and 88 shown in FIG. 2, each interference field being composed of P-wave and S-wave components. Within the two interference fields, there are four phase differences between the reference beam and the object beam can be obtained since the phases of the P-wave and S-wave components of the object beams are different and those of the P-wave and S-wave components of the reference beams are also different. In this exemplary embodiment, the optical module 22 further comprises a beam splitter 220, for splitting the polarized beam 81 into the first polarized beam 84 and the second polarized beam 82 in a non-polarization beam splitting manner; a phase retardation plate 221; and a reflective mirror 222.

In this exemplary embodiment, the beam splitter 220 is a non-polarization beam splitter plate, having a surface used as the beam splitting surface 2200. The retardation plate 221 is used for receiving the first polarized beam 84 to convert the same into a phase retarded beam 85 with a specified phase retardation, i.e. enabling a specified phase difference between the P-wave and S-wave components. In this embodiment, the phase retardation plate 221 is an octadic-wave plate, which can create a phase difference of 45 degrees between the P-wave and S-wave components. The reflective mirror 222 is used for reflecting the phase retarded beam 85 for forming another phase retarded beam 85a while directing the same to pass through the phase retardation plate 221 again and becoming a reference beam 86.

The phase difference between the P-wave and S-wave components of the reference beam 86 is formed as following: As soon as the polarized beam 81 passes through the beam splitter 220, it is split into the first polarized beam 84 and the second polarized beam 82 while maintaining the two beams to be linearly polarized. At the moment, there is no phase difference between the P-wave and S-wave components of the first polarized beam 84, and also none between the P-wave and S-wave components of the second polarized beam 82. However, as soon as the first polarized beam 84 passes through the phase retardation plate 221, a 45-degree phase difference is formed between the P-wave and S-wave components and thus it is converted into the phase retarded beam 85.

Thereafter, when the phase retarded beam 85 is vertically incident on the reflective mirror 222, it is reflected to form the phase retarded beam 85a, whereas the phase difference between the P-wave and S-wave components of the phase retarded beam 85a is still 45 degrees. As soon as the phase retarded beam 85a passes through the phase retardation plate 221, the phase difference between the P-wave and S-wave components is further delayed by 45 degrees. That is, the phase difference between the P-wave and S-wave components of the reference beam 86 is 90 degrees. Regarding to the second polarized beam 82, after being reflected by the object 90 measured, an object beam 83 is formed. It is noted that since no phase difference between the P-wave and S-wave components will be created during the reflection, there is no phase difference between the P-wave and S-wave components of the object beam 83.

The position of the reflective mirror 22 is limited to enable the optical-path difference between the first and second polarized beams 84 and 82 to be smaller than the coherence length of the light emitted from the light emitting unit 20, so that the reference beam 86 can interfere with the object beam 83. As shown in FIG. 2, the reflective mirror 222 is mounted on a movable device 223 so that the reflective mirror 222 can be moved toward/away from the beam splitter 220 for adjusting the optical-path difference between the reference and object beams. However, the reflective mirror 222 can be fixed at a specific location without being mounted on the movable device 223.

In this exemplary embodiment, the object beam is formed by the reflection of the second polarized beam 82 from the object 90. As the object 90 is placed on a movable platform 26 which can perform three-dimensional displacements and rotations, the location and inclination of the object 90 can be adjusted and thus the pitches and orientations of the fringes in the interferograms accordingly.

For adapting the aforesaid apparatus 2 to be used for measuring micro objects, an objective 29 can be additionally arranged at a position between the beam splitter 220 and the object 90.

The object beam 83 will intersect the reference beam 86 at the beam-splitting surface 2200 of the beam splitter 220 where a first interference field 87 and a second interference field 88 are generated as the first field 87 is formed by the combination of the reflection of the reference beam 86 and the transmission of the object beam 83 while the second field 88 is formed first by the combination of the transmission of the reference beam 86 and the reflection of the object beam 83 and then by the combined light field is reflected by the surface 2201 of the beam splitter 220.

It is noted that the reflected light of the reference beam 86 used for forming the first interference field 87 is generated by the reflection of the beam-splitting surface 2200 of the beam splitter 220, therefore, its phase is changed by 180 degrees as it is illuminated from a less dense media toward a more dense media. However, the phase of the transmission of the object beam 83 used to form the first interference field 87 remains unchanged since it is illuminated from a more dense media toward a less dense media. Similarly, the phase of the transmission of the reference beam 86 used for forming the second interference field 88 remains unchanged although it is illuminated from a less dense media toward a more dense media, and that is the same to the reflected light of the object beam 83 used for forming the second interference field 88 as it is illuminated from a more dense media toward a less dense media. Thus, the phase difference between the reference beam and the object beam in the first field 87 is different from that in the second field 88 by 180 degrees, which is true for both P-wave and S-wave components.

Figure 3A:
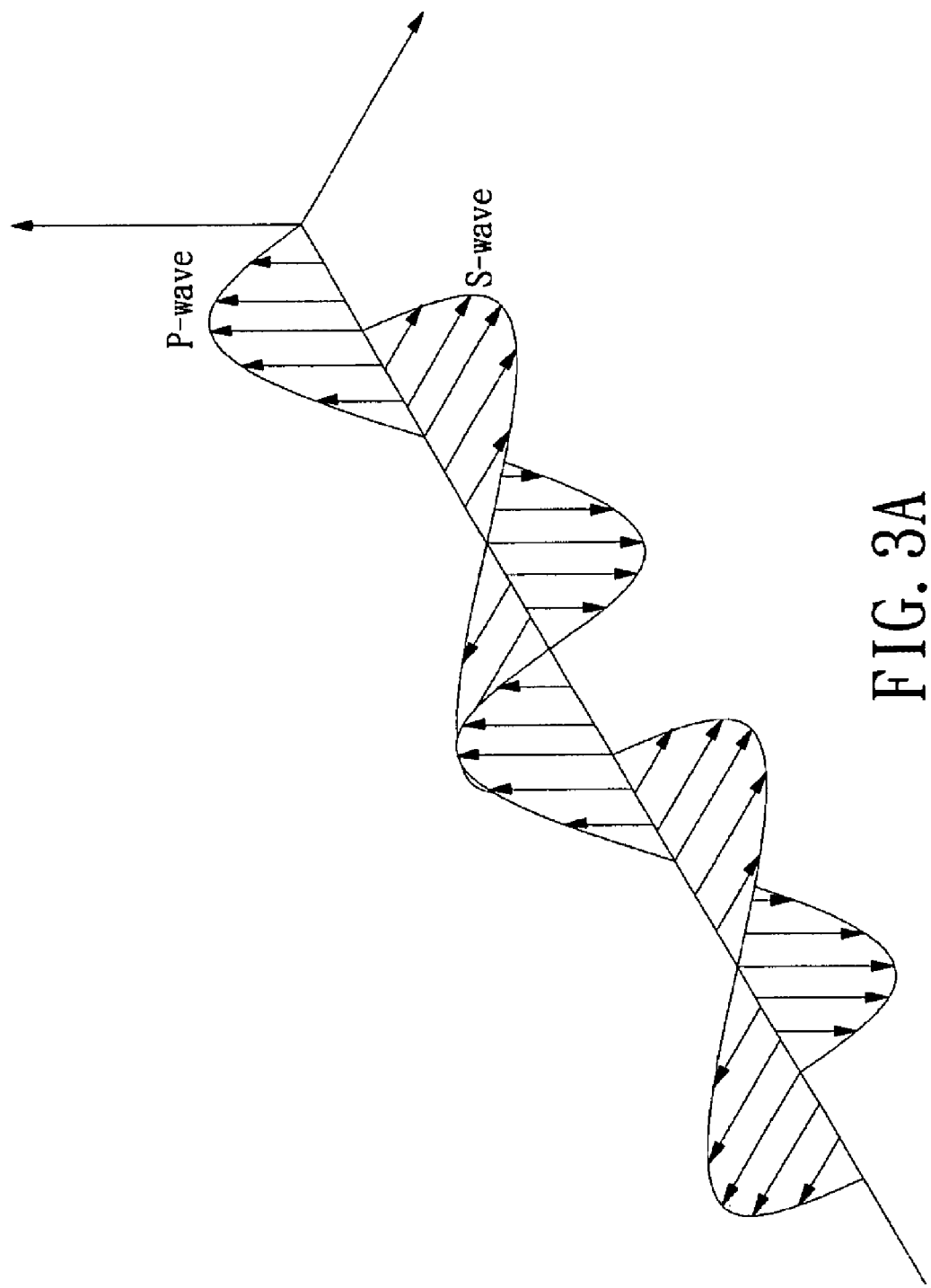
FIG. 3A and FIG. 3B are schematic diagrams showing the phase differences between a P-wave and an S-wave.
Figure 3B:
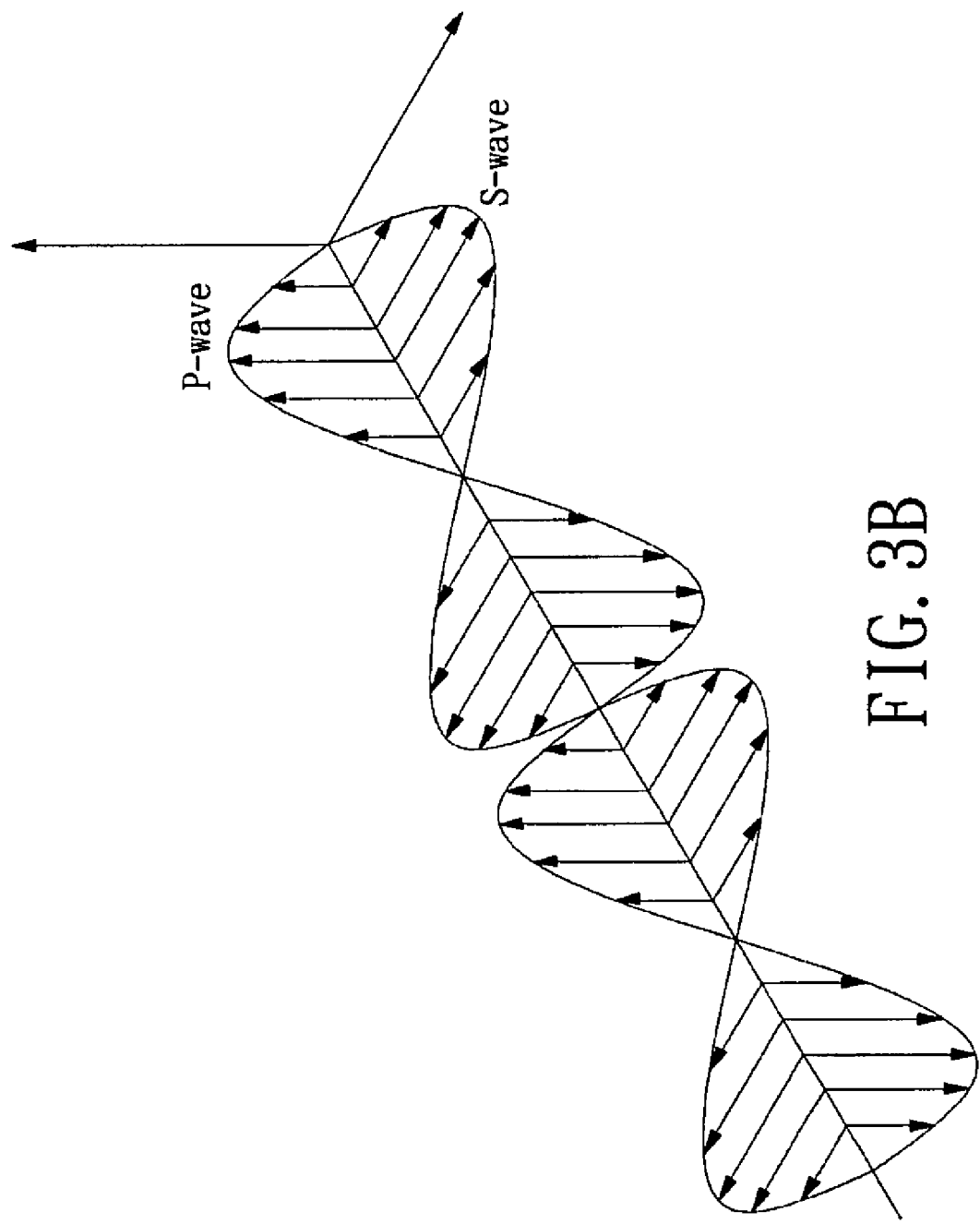

In FIG. 2, both the first field 87 and the second field 88 are projected to the polarization beam-splitting unit 23. The polarization beam-splitting unit 23 is positioned at a side of the optical module 22 for splitting the P-wave and S-wave components in both the first and second fields 87, 88, and thereby, forming four sub-fields of interference 870, 871, 880, and 881. As the phase difference between the P-wave and S-wave components of the reference beam 86 is 90 degrees, as shown in FIG. 3A, and the phase difference between the P-wave and S-wave components of the object beam 83 is 0 degree, as shown in FIG. 3B, and the phase difference between the first and the second fields 87, 88 is 180 degrees, there are respective 0-degree, 90-degree, 180-degree, and 270-degree phase differences between the reference beam and the object beam in the four sub-fields of interference, i.e. four different interferograms with different phase-shifts are obtained by the use of the same reference and object beams. Thereafter, the four sub-fields 870, 871, 880, and 881 are imaged by the image acquiring unit 24 in a single shooting action so as to obtain four interferograms with different phase differences between the reference and object beams. Finally, the four interferograms are input to an operation unit 25 for performing a four-step phase-shifting algorithm thereon so as to derive the phase information of the object 90. The four-step phase-shifting algorithm for this invention is not known to those skilled in the art that is going to be elaborated hereinafter.

Figure 4A:
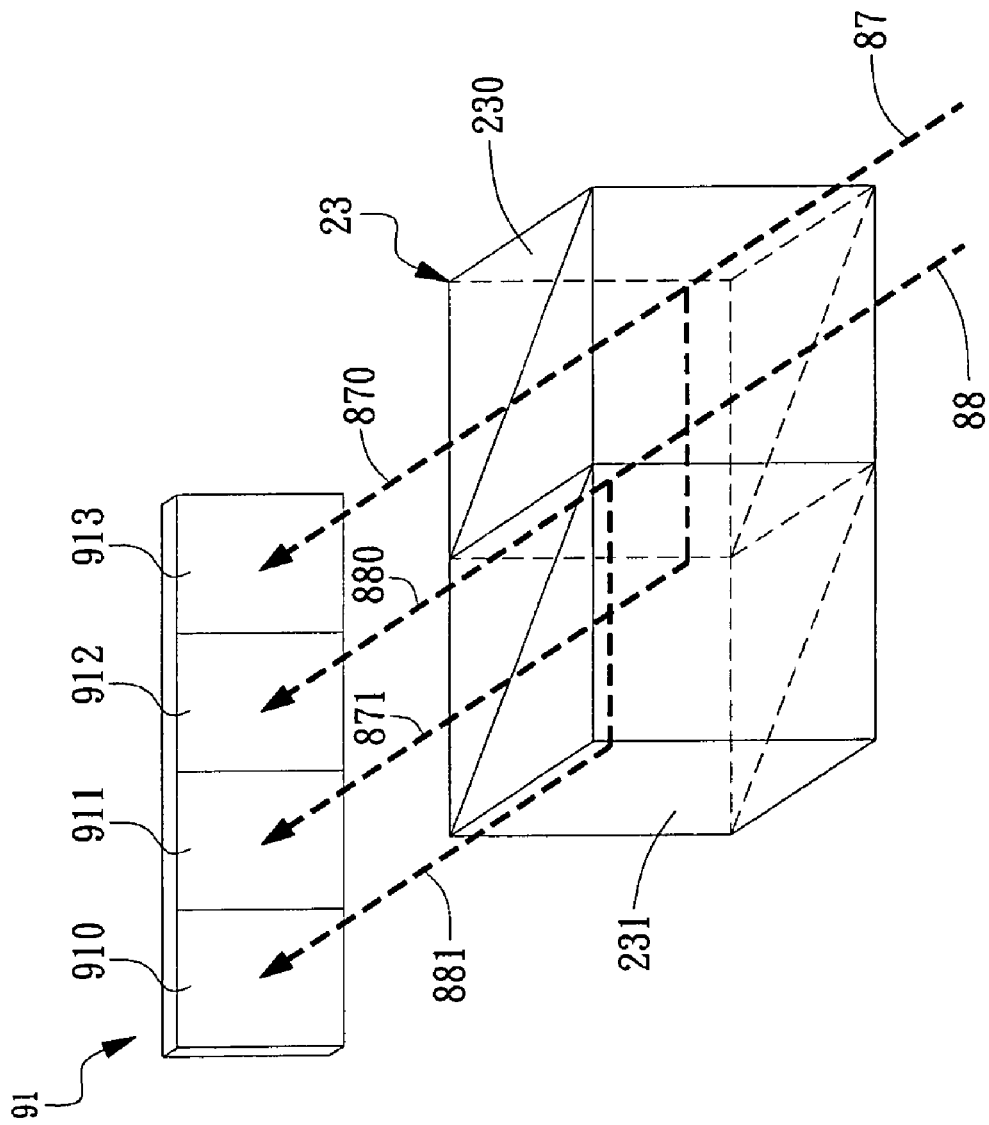
FIG. 4A and FIG. 4B are schematic diagrams showing the dividing of interference fields into a plurality of sub-fields of interference according to two different exemplary embodiment of the invention.

FIG. 4A is a schematic diagram showing the dividing of interference fields into four interferograms 910, 911, 912, and 913 with different phase differences while being arranged as a one-dimensional array, i.e. a 1×4 array. In the exemplary embodiment shown in FIG. 4A, the polarization beam-splitting unit 23 is composed of two parallel-arranged polarization beam splitters 230 and 231. Therefore, when the first interference field 87 passes through the polarization beam splitter 230, the transmitted P-wave component will form the sub-field of interference 870 with a 180-degree phase shift, while the reflected S-wave component is directed toward another polarization beam splitter 231 where it is reflected to form the sub-field of interference 871 with a 270-degree phase shift. In addition, when the second interference field 88 passes through the polarization beam splitter 230, the transmitted P-wave component will form the sub-field of interference 880 with a 0-degree phase shift, while the reflected S-wave component is directed toward another polarization beam splitter 231 where it is reflected to form the sub-field of interference 881 with a 90-degree phase shift. Thereafter, the four sub-fields 870, 871, 880, and 881 are imaged by the image acquiring unit 24 so as to generate one combined interferogram 91 composed of four sub-interferograms with different phase shifts 910-913, arranged as a one-dimensional array corresponding respectively to the four sub-fields of interference 870, 871, 880, and 881.

Moreover, the distance between the two reflected lights 871 and 881 (or the two transmitting lights 870 and 880), both generated by the use of the polarization beam-splitting unit 23, can be controlled by adjusting the thickness of the beam splitter 220. In addition, the distance between the sub-field 870 (or 880) transmitting the polarization beam splitter 230 and the sub-filed 871 (or 881) reflected by the polarization beam splitter 231 can be controlled by adjusting the relative positions of the two polarization beam splitters 230 and 231 along the progress direction of the first interference field 87 or the second interference field 88.

Figure 4B:
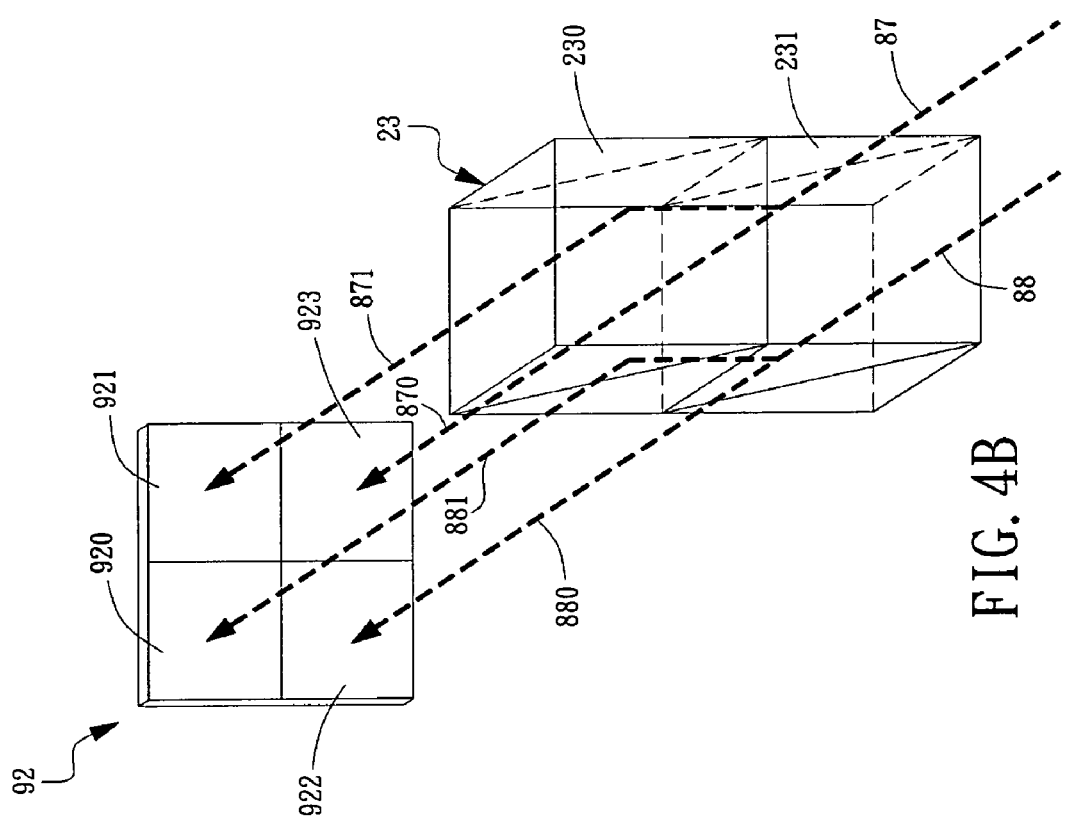

For the image acquiring unit 24 to capture images compactly, the four sub-interferograms can be rearranged as a 2×2 array so as to enhance the resolution of each sub-interferogram and thus increase the measurement accuracy. As shown in FIG. 4B, the two polarization beam splitters 230, and 231 are vertically arranged for aligning the four sub-fields of interference 870, 871, 880, and 881 as a 2×2 array so that the combined interferogram 92 of four sub-interferograms with different phase shifts 920~923 can also be arranged as a 2×2 array.

The apparatus shown in FIG. 2 can be adapted for measuring the surface features of an opaque object. However, for measuring the inner features of a transparent object or the micro thickness distribution of a bio organism, another apparatus will be provided as that shown in the exemplary embodiment in FIG. 5. Please refer to FIG. 5, which is a schematic view of an apparatus for simultaneously generating and acquiring interferograms according to a second exemplary embodiment of the invention. In this exemplary embodiment, the object 90 is a transparent object so that the second polarized beam 82 projected on the object 90 will pass through the object 90. It is noted that the formation of the polarized beam 81 is the similar to that shown in FIG. 2 and thus is not described further herein. Moreover, a splitting unit 225 is composed of a beam splitter 2250, a beam splitter plate 2251 and two reflective mirrors 2252 and 2253.

The beam splitter 2250 is a non-polarization beam splitter capable of receiving the polarized beam 81 for generating a first polarized beam 84 and a second polarized beam 82. The beam splitter plate 2251 with a beam-splitting surface 2254, being a non-polarization beam splitter plate, is arranged at a position between the phase retardation plate 221 and the beam splitter 2250 and used for receiving the reference beam 86 passing through the phase retardation plate 221. The reference beam 86 and the object beam 83 can be divided by the beam splitter plate 2251 into at least two interference fields 87 and 88. The two reflective mirrors 2252 and 2253 are capable of receiving the second polarized beam 82 and thus projecting the same to illuminate on the object 90.

The following description is related to the phase difference between the P-wave and S-wave components of the reference beam 86. When the polarized beam 81 passes through the beam splitter 2250, it is divided into the first and second polarized beams 84, 82, while maintaining the two beams to be 45-degree linearly polarized. At the moment, there is no phase difference between the P-wave and S-wave components of the first polarized beam 84, and also none between the P-wave and S-wave components of the second polarized beam 82. However, as soon as the first polarized beam 84 after passing the beam splitter plate 2251 passes through the phase retardation plate 221, being an octadic-wave plate in this embodiment, a 45-degree phase difference between the P-wave and S-wave components is formed and thus it is converted into the phase retarded beam 85. The phase retarded beam 85 is directed toward the reflective mirror 222 where it is reflected into another phase retarded beam 85a whose phase difference between the P-wave and S-wave components is still 45 degrees. Thereafter, the phase retarded beam 85a will pass through the phase retardation plate 221 again so as to be delayed by 45 degrees, forming a reference beam 86 whose phase difference between the P-wave and S-wave components is 90 degrees. As for the second polarized beam 82, it is first reflected by the two reflective mirrors 2252, 2253 and then projected toward the transparent object 90 while passing through the same so as to form the object beam 83. As there is no phase difference between the P-wave and S-wave components generated by the two reflective mirrors 2252, 2253 and the thin transparent object 90 with thickness of micrometer or nanometer orders, there will be no phase difference between the P-wave and S-wave components of the object beam 83.

The object beam 83 will intersect the reference beam 86 at the beam-splitting surface 2254 of the beam splitter plate 2251 where a first interference field 87 and a second interference field 88 are generated as the first field 87 is formed by the combination of the reflection of the reference beam 86 and the transmission of the object beam 83 while the second field 88 is formed first by the combination of the transmission of the reference beam 86 and the reflection of the object beam 83 and then by the reflection of the combined field from the surface 2255 of the beam splitter plate 2251. It is noted that the reflected light of the reference beam 86 used for forming the first interference field 87 is generated by the reflection of the beam-splitting surface 2254 of the beam splitter plate 2251, therefore, its phase is changed by 180 degrees. However, the phase of the transmission of the object beam 83 used to form the first interference field 87 remains unchanged. Similarly, the phase of the transmission of the reference beam 86 used for forming the second interference field 88 remains unchanged, and that is the same to the reflected light of the object beam 83 used for forming the second interference field 88. Thus, the phase difference between the reference beam 86 and the object beam 83 in the first field 87 is different from that in the second field 88 by 180 degrees, which is true for both P-wave and S-wave components.

It is noted that both the phase retardation plates used in the first and second embodiments of the invention are octadic-wave plates. However, as an octadic-wave plate is not very common and can be very expensive, it is intended in the present invention to use a cheaper and more commonly seen quarter-wave plate instead. Please refer to FIG. 6, which is a schematic view of an apparatus for simultaneously generating and acquiring interferograms according to a third exemplary embodiment of the invention. In this exemplary embodiment, the object 90 is not transparent and is arranged on a movable platform 26. In this embodiment, the optical module 22a is composed of: a first beam splitter 220a, being a non-polarization beam splitter; a phase retardation plate 221a, being a quarter-wave plate; a second beam splitter 223a, being a non-polarization beam splitter; a beam splitter plate 224a, being another non-polarization beam splitter; and a reflective mirror 222. The first beam splitter 220a is used for receiving the polarized beam 81 and thus generating a first polarized beam 84 and a second polarized beam 82, which are similar to those shown in FIG. 5 and thus are not described further herein.

The following description is related to the phase difference between the P-wave and S-wave components of the reference beam 86. Regarding to the first polarized beam 84, when it passes through the phase retardation plate 221a, a 45-degree phase difference is formed between the P-wave and S-wave components and thus it is being converted into the phase retarded beam 85. The phase retarded beam 85, passing through the beam splitter plate 224a, is directed toward the reflective mirror 222 to form a reference beam 86 whose phase difference between the P-wave and S-wave components is still 90 degrees. Regarding to the second polarized beam 82, it is first reflected by the reflective mirror 222a to illuminate toward the second beam splitter 223a, where it is directed to illuminate toward the object 90. After being reflected by the object 90 and thereafter passing through the second beam splitter 223a, an object beam 83 is formed. As no phase difference between the P-wave and S-wave components will be generated during the reflection and transmission from the reflective mirror 222a and the second beam splitter 223a, there is no phase difference between the P-wave and S-wave components of the object beam 83. The reference beam 86 and the object beam 83 will intersect with each other at the beam-splitting surface 2240a of the beam splitter plate 224a for generating a first interference field 87 and a second interference field 88, which are similar to that described in the aforementioned embodiments and thus is not described further herein.

Figure 7:
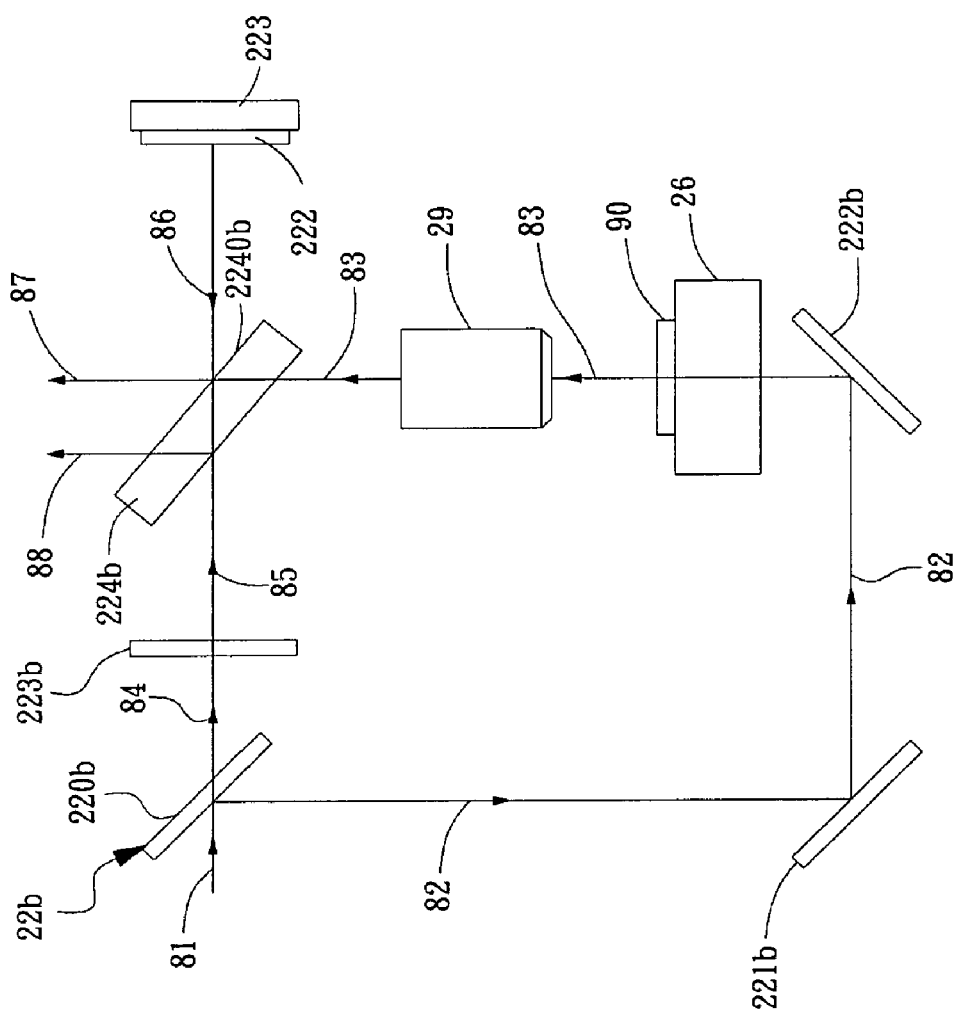
FIG. 7 is a schematic view of an apparatus for simultaneously generating and acquiring interferograms according to a fourth exemplary embodiment of the invention.

Please refer to FIG. 7, which is a schematic view of an apparatus for simultaneously generating and acquiring interferograms according to a fourth exemplary embodiment of the invention. In the fourth embodiment shown in FIG. 7, the object 90 measured is a transparent object. Moreover, In this fourth embodiment, the optical module 22b is composed of: a beam splitter 220b, being a non-polarization beam splitter; a phase retardation plate 223b, being a quarter-wave plate; a beam splitter plate 224b, being another non-polarization beam splitter with a beam-splitting surface 2240b; a reflective mirror 222 for a reference beam; and a plurality of reflective mirrors, such as 221b, 222b shown in FIG. 7. The beam splitter 220b is used for receiving the polarized beam 81 and thus generating a first polarized beam 84 and a second polarized beam 82. The first polarized beam 84 is directed to pass through the phase retardation plate 223b and the beam splitter plate 224, and then illuminate toward the reflective mirror 222 to form the reference beam 86. The second polarized beam 82 is reflected by the guidance of the plural reflective mirrors 221b, 222b, to be directed to pass through the object 90, forming the object beam 83. The object beam 83 will intersect the reference beam 86 at the beam-splitting surface 2240b of the beam splitter plate 224b where a first interference field 87 and a second interference field 88 are generated in a manner similar to those described in the aforesaid embodiments.

Figure 8A:
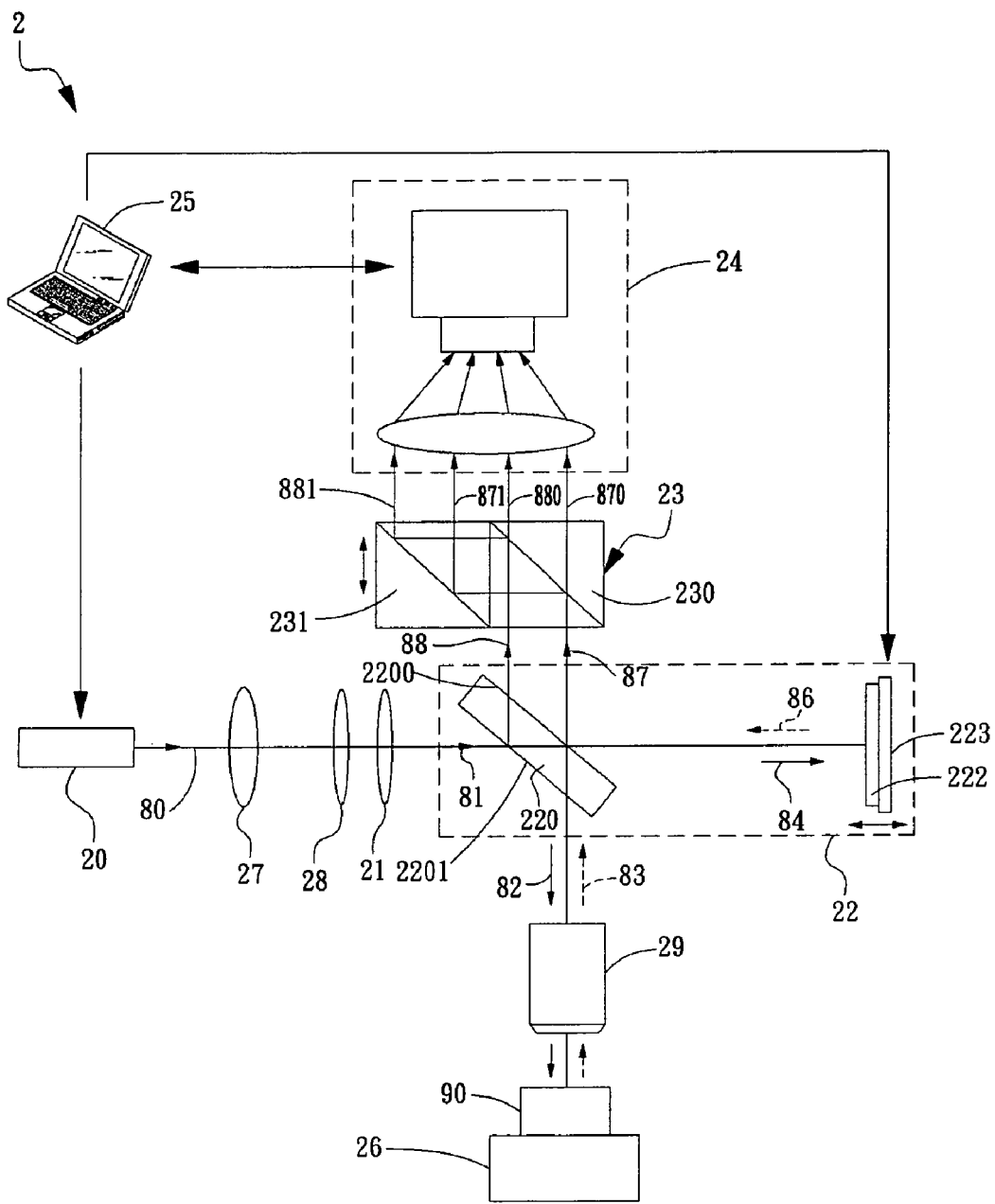
FIG. 8A is a schematic view of an apparatus for simultaneously generating and acquiring interferograms according to a fifth exemplary embodiment of the invention.

In all the four embodiments stated hereinbefore, the so-generated four interferograms possess four different phase differences between the reference and object beams. Nevertheless, there can be an apparatus capable of generating four interferograms with only two different phase differences between the reference and object beams, as the fifth embodiment shown in FIG. 8A. In FIG. 8A, the object beam 83 is reflected from the object 90, so the embodiment is only suited to measure opaque objects. In this fifth embodiment, the optical module 22 only contains a beam splitter 220 and a reflective mirror 222. Thus, the apparatus in FIG. 8A can be considered as the apparatus shown in FIG. 2 without the phase retardation plate 221.

In FIG. 8A, when the polarized beam 81 passes the beam splitter 220, it is split into a first polarized beam 84 and a second polarized beam 82 while maintaining the two beams to be 45-degree linearly polarized. It is noted that the reference beam 86 is formed by the reflection of the first polarized beam 84 from the reflective mirror 222, in that the phase difference of the P-wave and S-wave components of the reference beam 86 is 0 degree. As the forming of the object beam 83 by the use of the second polarized beam is similar to that described in the embodiment shown in FIG. 2, it is not described further herein.

The object beam 83 will intersect the reference beam 86 at the beam-splitting surface 2200 of the beam splitter 220 where a first interference field 87 and a second interference field 88 are generated as the first field 87 is formed by the combination of the reflection of the reference beam 86 and the transmission of the object beam 83 while the second field 88 is formed first by the combination of the transmission of the reference beam 86 and the reflection of the object beam 83 and then by the reflection of the combined light from the surface 2201 of the beam splitter 220. It is noted that the reflected light of the reference beam 86 used for forming the first interference field 87 is generated by the reflection of the beam-splitting surface 2200 of the beam splitter 220, therefore, its phase is changed by 180 degrees. However, the phase of the transmission of the object beam 83 used to form the first interference field 87 remains unchanged.

Figure 8B:
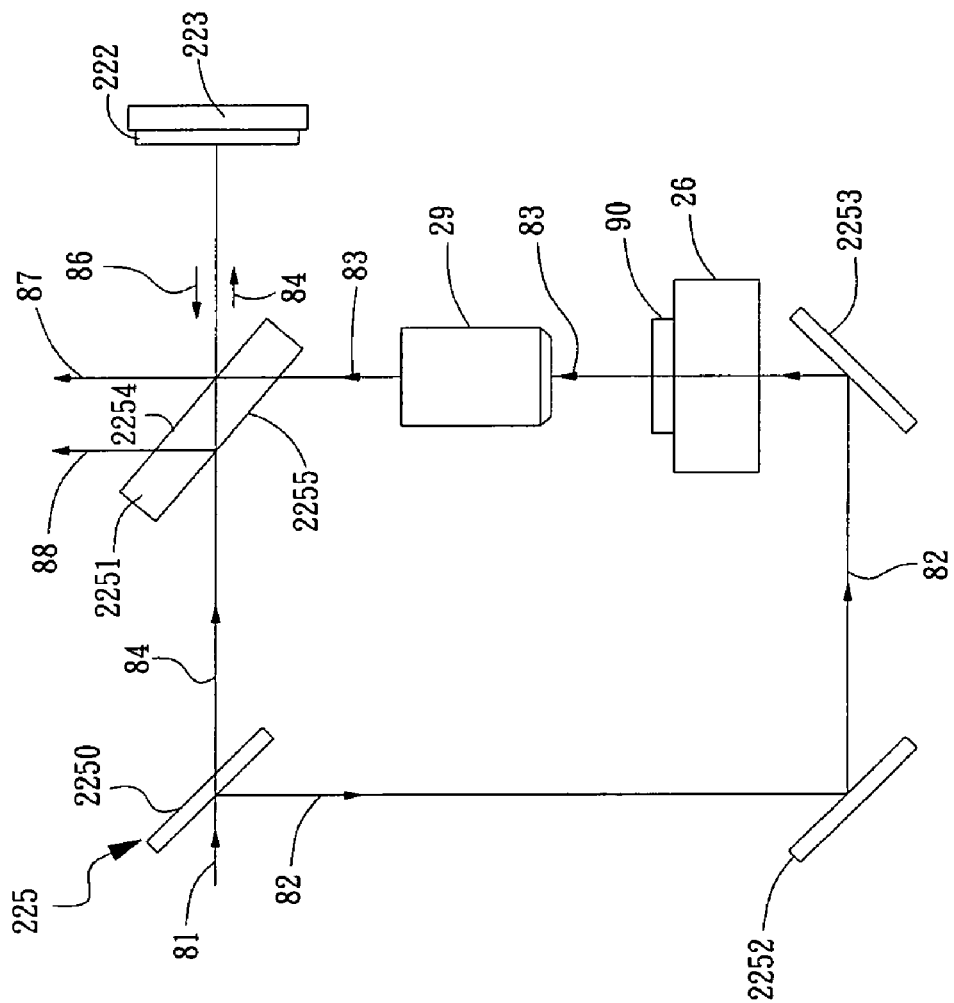
FIG. 8B is a schematic view of an apparatus for simultaneously generating and acquiring interferograms according to a sixth exemplary embodiment of the invention.

Similarly, the phase of the transmission of the reference beam 86 used for forming the second interference field 88 remains unchanged, and that is the same to the reflected light of the object beam 83 used for forming the second interference field 88. Thereafter, the first field 87 and the second field 88 enter the polarization beam-splitting unit 23 simultaneously, and thereby, generate four sub-fields of interference 870, 871, 880, and 881, in which the phase differences between the reference beam and the object beam in both the two sub-fields 870 and 871 (for P-wave components) of the first field 87 are 180 degrees, and the phase differences between the reference beam and the object beam in both the two sub-fields 880 and 881 (for S-wave components) of the second field 88 are 180 degrees. Therefore, the embodiment in FIG. 8A can generate interferograms with only two phase differences. It is noted that the object beam 83 in FIG. 8A is the reflection from the object 90 and is not suitable for measuring a transparent object. Therefore, an apparatus adapted for measuring a transparent object is structured as the apparatus of FIG. 5 but without the phase retardation plate 221 and the sixth exemplary embodiment is shown in FIG. 8B. While the exemplary embodiments in FIG. 8A and FIG. 8B have been set forth for the purpose of disclosure, modifications of the disclosed embodiments of the invention as well as other embodiments thereof may occur to those skilled in the art, such as an apparatus capable of functioning similar to that shown in FIG. 8A can be obtained by removing the phase retardation plate from the apparatus in FIG. 6. Accordingly, the appended claims are intended to cover all embodiments which do not depart from the spirit and scope of the invention.

Figure 9:
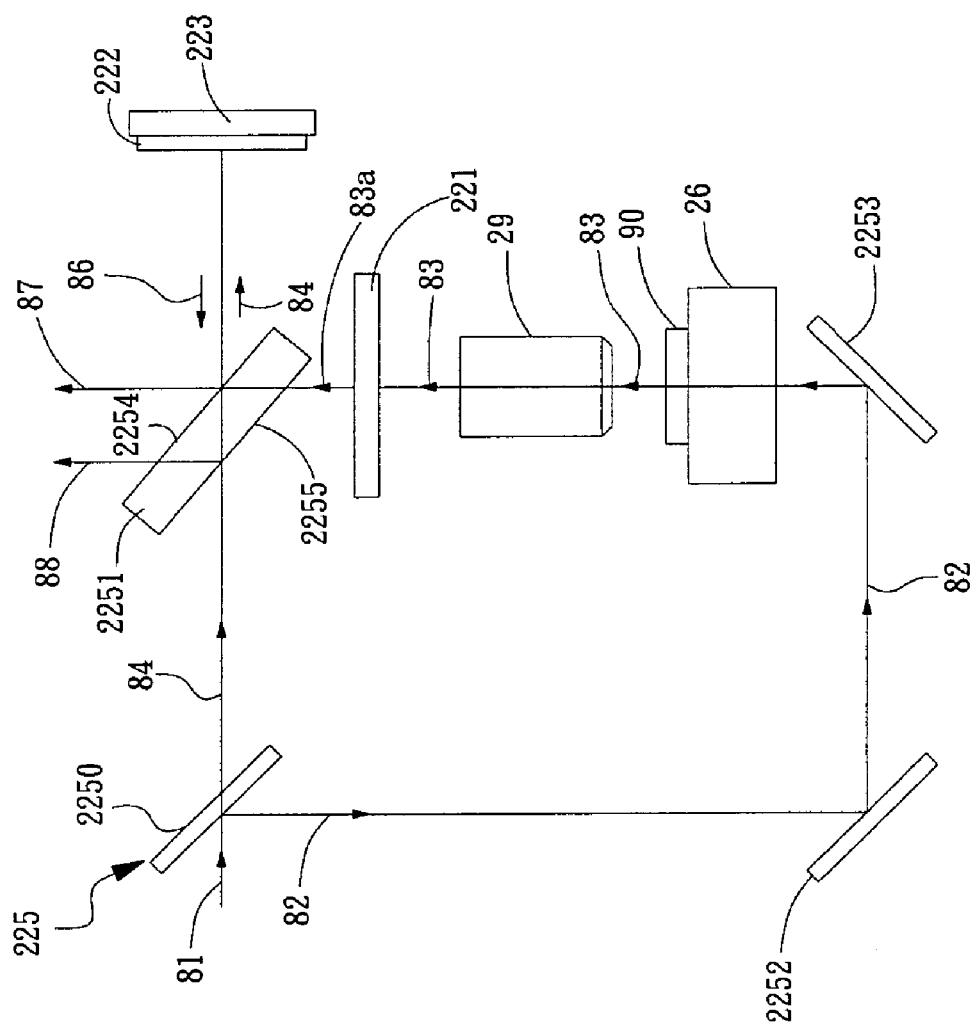
FIG. 9 is a schematic view of an apparatus for simultaneously generating and acquiring interferograms according to a seventh exemplary embodiment of the invention.

It is noted that in all the embodiments shown in FIG. 2, FIG. 5, FIG. 6, FIG. 7, FIG. 8A, and FIG. 8B, the phase retardation plates are always positioned at the path only about the reference beam. However, in actual situation, it is not limited to be positioned at the such path. Please refer to FIG. 9, which is a schematic view of an apparatus for simultaneously generating and acquiring interferograms according to a seventh exemplary embodiment of the invention. In FIG. 9, the phase retardation plate 221 is positioned at the path about the object beam, and it is a quarter-wave plate.

In FIG. 9, when the polarized beam 81 passes the beam splitter 2250, it is split into a first polarized beam 84 and a second polarized beam 82 while maintaining the two beams to be linearly polarized at 45 degrees. It is noted that the reference beam 86 is formed by the reflection of the first polarized beam 84 from the reference beam reflecting mirror 222, in that the phase difference of the P-wave and S-wave components of the reference beam 86 is 0 degree. Moreover, the second polarized beam 82 is reflected by the guidance of the plural reflective mirrors 2252 and 2253, to be directed to pass through the object 90, forming the object beam 83.

As soon as the object beam passes the phase retardation plate 221, it is delayed by 90 degrees, that is, there is a 90-degree phase difference between the P-wave and S-wave components of the object beam 83, and thus a phase-retarded object beam 83a is formed. The reference beam 86 and the object beam 83a will intersect at the beam-splitting surface 2254 of the beam splitter plate 2251 for generating the first interference field 87 and the second interference field 88, which are similar to that described in the aforementioned embodiments and thus are not described further herein.

Figure 5:
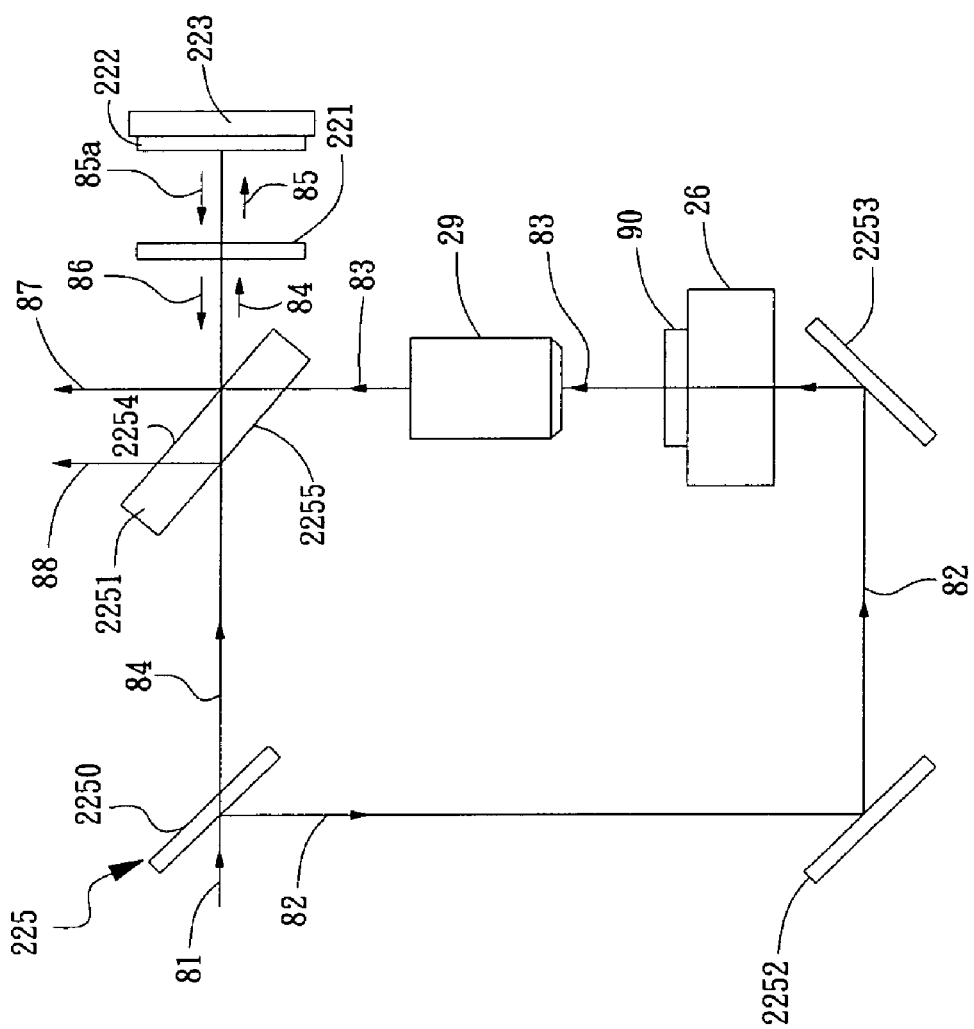
FIG. 5 is a schematic view of an apparatus for simultaneously generating and acquiring interferograms according to a second exemplary embodiment of the invention.
Figure 6:
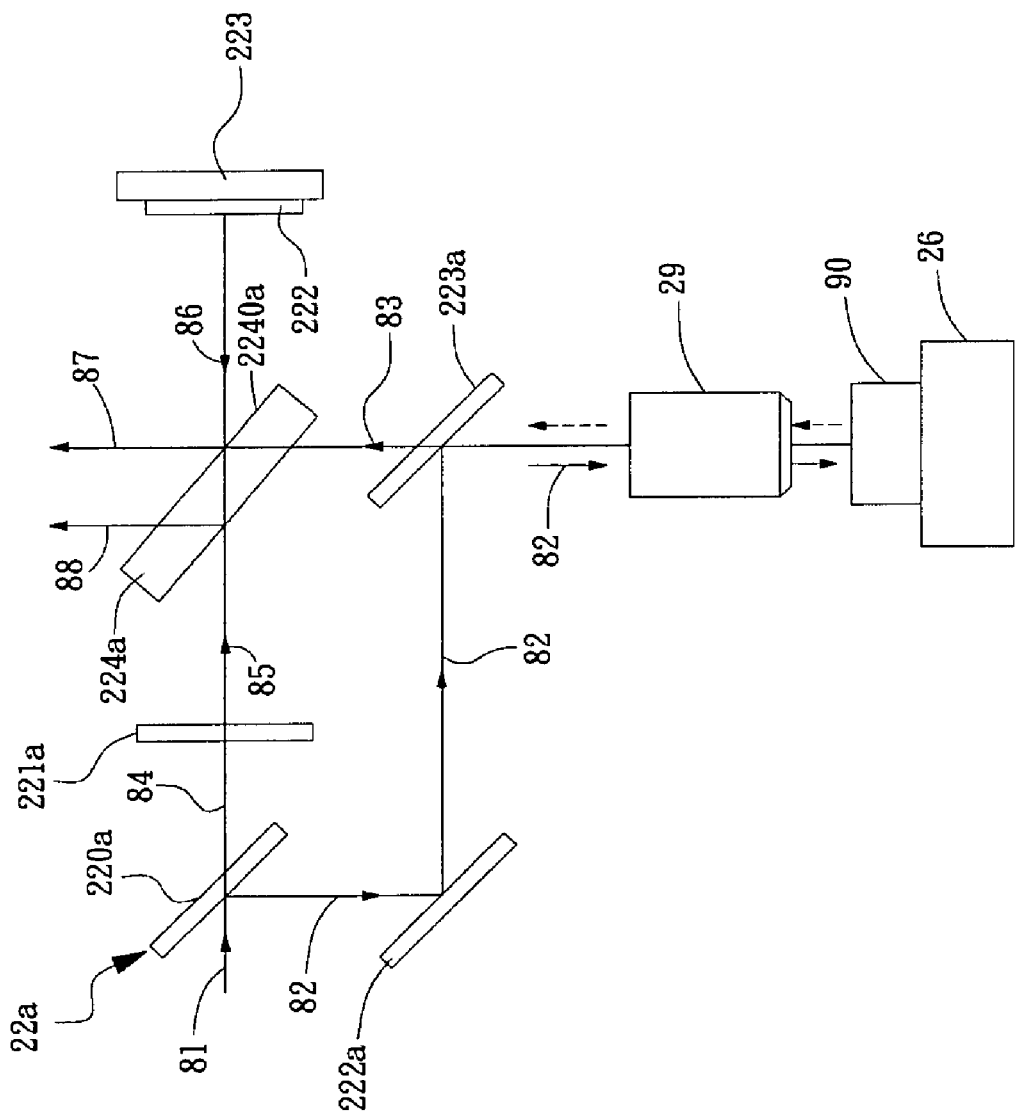
FIG. 6 is a schematic view of an apparatus for simultaneously generating and acquiring interferograms according to a third exemplary embodiment of the invention.

Each of the beam splitter 220 in FIG. 2, the beam splitter 2250 and the splitter plate 2251 in FIG. 5, the first beam splitter 220a, the second beam splitter 223a, and the beam splitter plate 224a in FIG. 6, the beam splitter 220b and the beam splitter plate 224b in FIG. 7, the beam splitter 220 in FIG. 8A, the beam splitter 2250 and the beam splitter plate 2254 in FIG. 8B, and the beam splitter 2250 and the beam splitter plate 2251 in FIG. 9 can be a glass plate.

Figure 10:
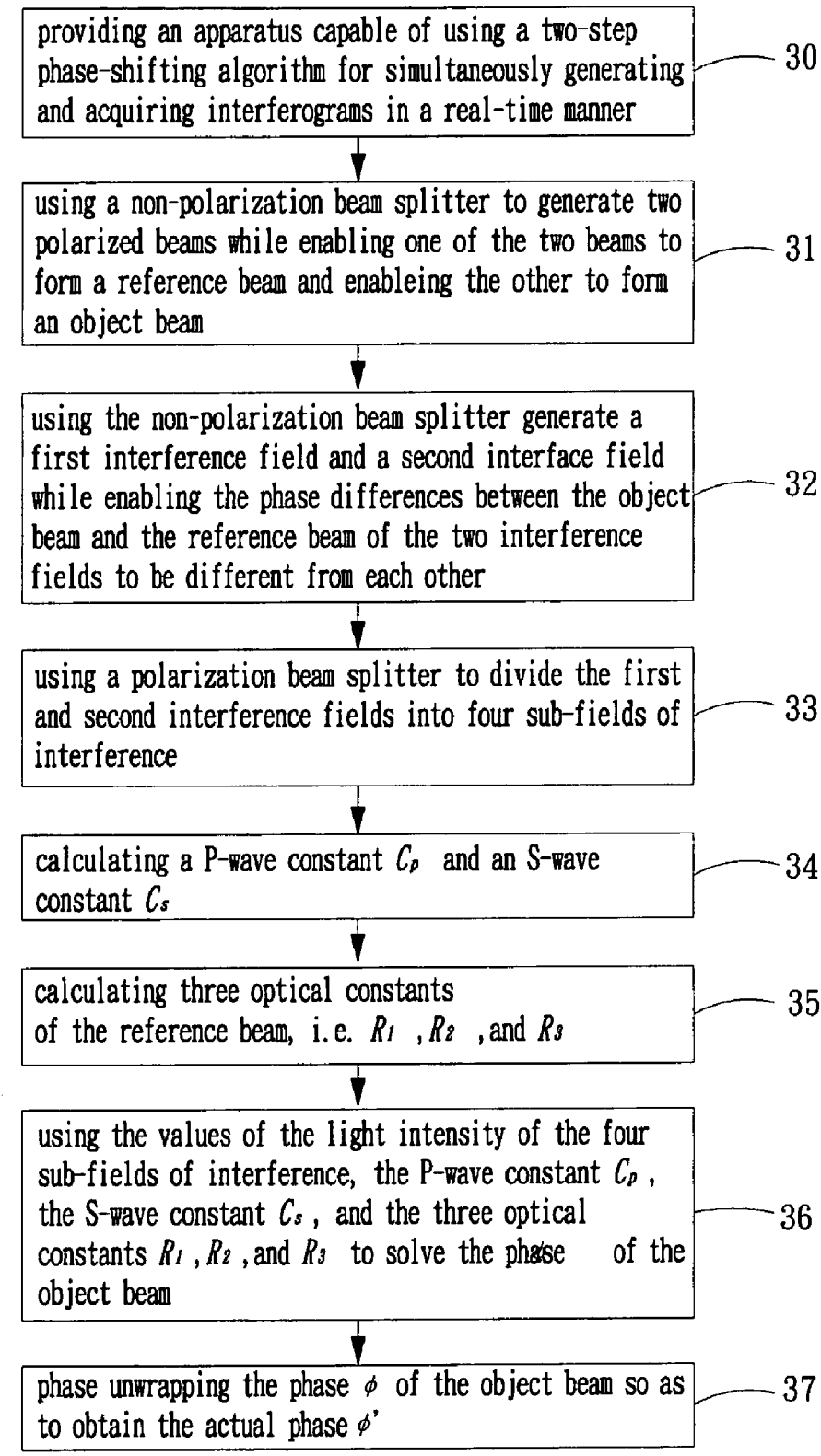
FIG. 10 is a flow chart showing steps for solving phase information of the object beam from an apparatus using a two-step phase-shifting algorithm for simultaneously generating and acquiring interferograms in a real-time manner according to an exemplary embodiment of the invention.

In addition to the aforesaid method for simultaneously generating and acquiring interferograms in a real-time manner, the present invention also provide a method for analyzing the phase information of the object beam form the interferograms acquired from the apparatus using the two-step phase-shifting algorithm as those shown in FIG. 8A and FIG. 8B. It is noted that as soon as the phase information is derived, for the embodiment in FIG. 8A, it means that the height distribution of the surface of the object 90 can be calculated and obtained, and thus a three-dimensional image describing the surface of the object 90 can be established, moreover, for the embodiment in FIG. 8B, it means that the thickness distribution of the object 90 can be calculated and obtained. Please refer to FIG. 10, which is a flow chart showing steps for solving the phase information of an object beam for an apparatus using a two-step phase-shifting algorithm for simultaneously generating and acquiring interferograms in a real-time manner according to an exemplary embodiment of the invention. It is noted that, for illustration, the steps of the analyzing method in FIG. 10 is demonstrated by the use of the apparatus shown in FIG. 8A. However, when the apparatus in FIG. 8B is used, the steps are similar. The flow starts at step 30, an apparatus capable of using a two-step phase-shifting algorithm for simultaneously generating and acquiring interferograms in a real-time manner is provided, and then the flow proceeds to step 31. At step 31, a non-polarization beam splitter 220 arranged in the aforesaid apparatus is used to generate two polarized beams while respectively enabling one of the two beams to form a reference beam and the other to form an object beam, and then the flow proceeds to step 32. At step 32, the non-polarization beam splitter 220 is used to combine the two polarized beams so as to generate the first interference field 87 and the second interference field 88 while enabling the phase differences between the object beam and the reference beam of the two interference fields to be different from each other, noting that the phase difference between the P-wave and S-wave components of the reference beam is 0 degree for the reference beam and that is the same for the object beam, and then the flow proceeds to step 33. At step 33, a polarizing beam splitter 23 is used to divide the first and second interference fields 87 and 88 into four sub-fields of interference 870, 871, 880, and 881, and then the flow proceeds to step 34. At step 34, a P-wave constant $C_p$ and an S-wave constant $C_s$ are calculated, and then the flow proceeds to step 35.

With reference to FIG. 8A, as the sub-field 870 is formed by the interference of the object beam passing the beam splitter 220 and the reflection of the reference beam from the beam splitter 220, the light intensity of the sub-field 870 can be represented as $I_{pOT}+I_{pRR}$; as the sub-field 880 is formed by the interference of the reference beam passing the beam splitter 220 and the reflection of the object beam from the beam splitter 220, the light intensity of the sub-field 880 can be represented as $I_{pOR}+I_{pRT}$; as the sub-field 871 is formed by the interference of the object beam passing the beam splitter 220 and the reflection of the reference beam from the beam splitter 220, the light intensity of the sub-field 871 can be represented as $I_{sOT}+I_{sRR}$; and as the sub-field 881 is formed by the interference of the reference beam passing the beam splitter 220 and the reflection of the object beam from the beam splitter 220, the light intensity of the sub-field 881 can be represented as $I_{sOR}+I_{sRT}$; wherein the symbol I denotes intensity, the first subscripts p and s denote P-wave and S-wave components, respectively, the second subscripts O and R denote object and reference beams, respectively, and the third subscripts T and R denote transmission and reflection, reflectively. Thereafter, four parameters are defined as:

$$C_{p1} = \frac{I_{pOT}}{I_{pRR}}; \quad C_{p2} = \frac{I_{pOR}}{I_{pRT}}; \quad C_{s1} = \frac{I_{sOT}}{I_{sRR}}; \quad C_{s2} = \frac{I_{sOR}}{I_{sRT}}.$$

Figure 11:
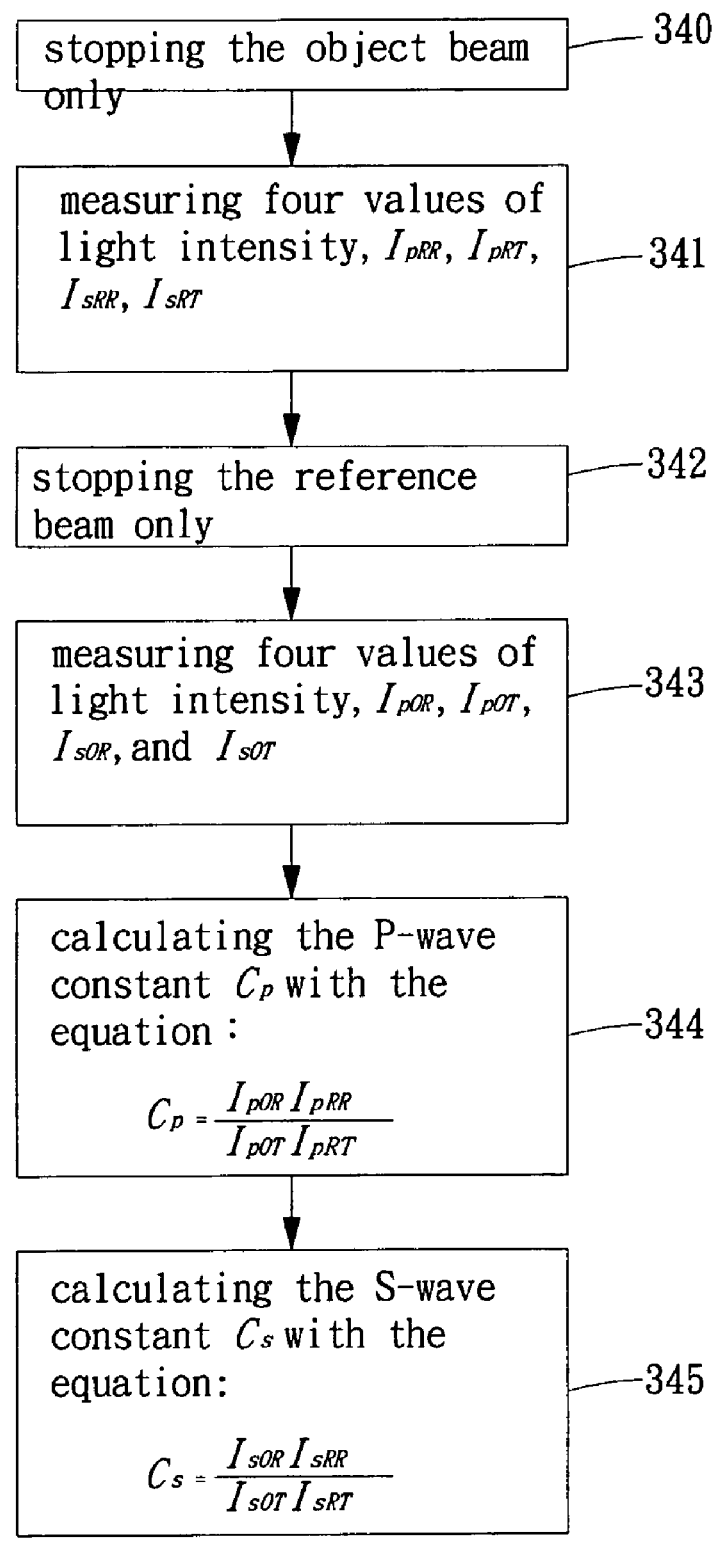
FIG. 11 is a flow chart showing steps for calculating a P-wave constant $C_p$ and an S-wave constant $C_s$ of the invention.

Please refer to FIG. 11, which is a flow chart showing steps for calculating the P-wave constant $C_p$ and the S-wave constant $C_s$ of the invention. The flow starts at step 340. At step 340, the object beam 83 is stopped only, and then the flow proceeds to step 341. At step 341, the four values of light intensity only about the reference beam, i.e. $I_{pRR}$ of the sub-field 870, $I_{pRT}$ of the sub-field 880, $I_{sRR}$ of the sub-field 871, $I_{sRT}$ of the sub-field 881, are measured, where the four sub-fields are formed only by the reference beam and thus they all can't create interferograms, and then the flow proceeds to step 342. At step 342, the reference beam 86 is stopped only, and then the flow proceeds to step 343. At step 343, the four values of light intensity only about the object beam, i.e. $I_{pOT}$ of the sub-field 870, $I_{pOR}$ of the sub-field 880, $I_{sOT}$ of the sub-field 871, $I_{sOR}$ of the sub-field 881, are measured, where the four sub-fields are formed only by the object beam and thus they all can't create interferograms, and then the flow proceeds to step 344. At step 344, the P-wave constant $C_p$ can be calculated by the equation below:

$$C_p = \frac{C_{p2}}{C_{p1}} = \frac{I_{pOR}/I_{pRT}}{I_{pOT}/I_{pRR}} = \frac{I_{pOR}I_{pRR}}{I_{pOT}I_{pRT}}; \quad (1)$$

and then the flow proceeds to step 345. At step 345, the S-wave constant $C_s$ can be calculated by the equation below:

$$C_s = \frac{C_{s2}}{C_{s1}} = \frac{I_{sOR}/I_{sRT}}{I_{sOT}/I_{sRR}} = \frac{I_{sOR}I_{sRR}}{I_{sOT}I_{sRT}}. \quad (2)$$

As $C_p$ and $C_s$ represent the light splitting characteristics of the beam splitter 220, the two values $C_p$ and $C_s$ are determined as soon as the beam splitter 220 is selected in the apparatus of the invention. Back to FIG. 10, after step 34, step 35 is performed. At step 35, three optical constants only about the reference beam, i.e. $R_1$, $R_2$, $R_3$, are calculated, where, $$R_1 = \frac{I_{pRR}}{I_{sRT}}; \quad R_2 = \frac{I_{pRT}}{I_{sRT}}; \quad R_3 = \frac{I_{sRR}}{I_{sRT}};$$

and then the flow proceeds to step 36. It is noted that the aforesaid three optical constants are not related to the object beam and thus can be simply calculated by using the four values measured at step 341 in FIG. 11.

At step 36, the light intensity of the four sub-fields of interference is measured while both object and reference beams are not stopped, then the four intensity values are measured. Then the flow proceeds to step 37. It is noted that the light intensity of each sub-field can be described by the following equation:

$$I_n = (I_O + I_R) + 2\sqrt{I_O I_R} \cos(\phi + \alpha_n), \quad (3)$$

where, $I_n$ is the light intensity of the $n^{th}$ sub-field of interference;
$I_O$ is the light intensity of the object beam in the corresponding sub-field;
$I_R$ is the light intensity of the reference beam in the corresponding sub-field;
$\phi$ is the phase of the object beam;
$\alpha_n$ is the phase shifted for the $n^{th}$ sub-field of interference.

Taking the interferograms with two phase shifts, e.g. $\alpha_1 = \alpha_3 = 180°$ and $\alpha_2 = \alpha_4 = 0°$, basing on the aforesaid equation (3), the light intensity of the four sub-fields can be calculated as following:

$$\begin{aligned}
I_1 &= (I_{pOT} + I_{pRR}) + 2\sqrt{I_{pOT}I_{pRR}} \cos(\phi + 180°) \\
&= I_{pRR}\left[\left(1 + \frac{I_{pOT}}{I_{pRR}}\right) + 2\sqrt{\frac{I_{pOT}}{I_{pRR}}} \times (-\cos\phi)\right] \\
&= R_1 I\left[(1 + C_{p1}) - 2\sqrt{C_{p1}} \cos\phi\right],
\end{aligned} \quad (4)$$

$$\begin{aligned}
I_2 &= (I_{pOR} + I_{pRT}) + 2\sqrt{I_{pOR}I_{pRT}} \cos(\phi + 0°) \\
&= I_{pRT}\left[\left(1 + \frac{I_{pOR}}{I_{pRT}}\right) + 2\sqrt{\frac{I_{pOR}}{I_{pRT}}} \times (\cos\phi)\right] \\
&= R_2 I\left[(1 + C_{p2}) + 2\sqrt{C_{p2}} \cos\phi\right],
\end{aligned} \quad (5)$$

$$\begin{aligned}
I_3 &= (I_{sOT} + I_{sRR}) + 2\sqrt{I_{sOT}I_{sRR}} \cos(\phi + 180°) \\
&= I_{sRR}\left[\left(1 + \frac{I_{sOT}}{I_{sRR}}\right) + 2\sqrt{\frac{I_{sOT}}{I_{sRR}}} \times (-\cos\phi)\right] \\
&= R_3 I\left[(1 + C_{s1}) - 2\sqrt{C_{s1}} \cos\phi\right],
\end{aligned} \quad (6)$$

$$\begin{aligned}
I_4 &= (I_{sOR} + I_{sRT}) + 2\sqrt{I_{sOR}I_{sRT}} \cos(\phi + 0°) \\
&= I_{sRT}\left[\left(1 + \frac{I_{sOR}}{I_{sRT}}\right) + 2\sqrt{\frac{I_{sOR}}{I_{sRT}}} \times (\cos\phi)\right] \\
&= I\left[(1 + C_{s2}) + 2\sqrt{C_{s2}} \cos\phi\right],
\end{aligned} \quad (7)$$

where, $I_1$ is the light intensity of the sub-filed 870;
$I_2$ is the light intensity of the sub-filed 880;
$I_3$ is the light intensity of the sub-filed 871;
$I_4$ is the light intensity of the sub-filed 881;
$I = I_{sRT}$, being an unknown light intensity value.

As there are six unknown values in the functions (1), (2), (4), (5), (6), and (7), i.e. $C_{p1}$, $C_{p2}$, $C_{s1}$, $C_{s2}$, I, and $\phi$, the six unknown values can be solved by combining the six equations. As $\phi$ is calculated from the $\cos^{-1}$ function, its value ranges between 0° and 180°.

Back to FIG. 10, after the phase $\phi$ is obtained, the step 37 is performed. At step 37, a phase unwrapping algorithm is performed upon the phase $\phi$ so as to obtain $\phi'$, which is the actual phase of the object beam, so that $\phi'$ is no longer limited between 0° and 180°. It is noted that the phase unwrapping algorithm is known to those skilled in the art and thus is not described further herein. After $\phi'$ had been obtained, it can be used for calculating the relative height h of the surface of the object to be measured or the thickness t of the object, respectively with the following equations:

$$h = \frac{\phi}{720°}\lambda, \tag{8a}$$

$$t = \frac{\phi}{360° \, n}\lambda, \tag{8b}$$

where, $\lambda$ is the average wavelength of the measuring beam; n is the refraction index of the object to be measured.

The aforesaid phase analyzing method can also be adapted for solving $\phi$ of the interferograms acquiring by the use of a four-step phase-shifting algorithm. It is noted that the interferograms acquired by the apparatus in FIG. 2 as well as those acquired by the apparatuses in FIG. 5, FIG. 6, and FIG. 7 can all be used in similar manners. Thus, the interferograms created by the apparatus in FIG. 2 are used for illustration. Assume that there are respective 0-degree, 90-degree, 180-degree, and 270-degree phase differences between the reference beam and the object beams in the four sub-fields of interference. Therefore, according to the equation (3) while defining $\alpha_1=180°$, $\alpha_2=0°$, $\alpha_3=270°$, and $\alpha_4=90°$ the light intensity of the four sub-fields can be obtained as below:

$$\begin{aligned} I_1 &= (I_{pOT} + I_{pRR}) + 2\sqrt{I_{pOT}I_{pRR}} \cos(\phi + 180°) \\ &= I_{pRR}\left[\left(1 + \frac{I_{pOT}}{I_{pRR}}\right) + 2\sqrt{\frac{I_{pOT}}{I_{pRR}}} \times (-\cos\phi)\right] \\ &= R_1 I\left[(1 + C_{p1}) - 2\sqrt{C_{p1}} \cos\phi\right] \end{aligned} \tag{9}$$

$$\begin{aligned} I_2 &= (I_{pOR} + I_{pRT}) + 2\sqrt{I_{pOR}I_{pRT}} \cos(\phi + 0°) \\ &= I_{pRT}\left[\left(1 + \frac{I_{pOR}}{I_{pRT}}\right) + 2\sqrt{\frac{I_{pOR}}{I_{pRT}}} \times (\cos\phi)\right] \\ &= R_2 I\left[(1 + C_{p2}) + 2\sqrt{C_{p2}} \cos\phi\right] \end{aligned} \tag{10}$$

$$\begin{aligned} I_3 &= (I_{sOT} + I_{sRR}) + 2\sqrt{I_{sOT}I_{sRR}} \cos(\phi + 270°) \\ &= I_{sRR}\left[\left(1 + \frac{I_{sOT}}{I_{sRR}}\right) + 2\sqrt{\frac{I_{sOT}}{I_{sRR}}} \times (\sin\phi)\right] \\ &= R_3 I\left[(1 + C_{s1}) + 2\sqrt{C_{s1}} \sin\phi\right] \end{aligned} \tag{11}$$

$$\begin{aligned} I_4 &= (I_{sOR} + I_{sRT}) + 2\sqrt{I_{sOR}I_{sRT}} \cos(\phi + 90°) \\ &= I_{sRT}\left[\left(1 + \frac{I_{sOR}}{I_{sRT}}\right) + 2\sqrt{\frac{I_{sOR}}{I_{sRT}}} \times (-\sin\phi)\right] \\ &= I\left[(1 + C_{s2}) - 2\sqrt{C_{s2}} \sin\phi\right] \end{aligned} \tag{12}$$

As there are six unknown values in the equations (1), (2), (9), (10), (11), and (12), i.e. $C_{p1}$, $C_{p2}$, $C_{s1}$, $C_{s2}$, I, and $\phi$, the six unknown value can be solved by the combined six equations. As $\phi$ is calculated from the $\cos^{-1}$ function, its value ranges between 0° and 180° and thus required to perform a phase unwrapping algorithm thereon for obtaining the actual phase, i.e. $\phi'$.

Accordingly, only if the light intensity of the four simultaneously generated interferograms can be represented by the equations.

$$I_1 = R_1 I[(1+C_{p1}) + 2\sqrt{C_{p1}} \cos(\phi+\alpha_1)], \tag{13}$$

$$I_2 = R_2 I[(1+C_{p2}) + 2\sqrt{C_{p2}} \cos(\phi+\alpha_2)], \tag{14}$$

$$I_3 = R_3 I[(1+C_{s1}) + 2\sqrt{C_{s1}} \cos(\phi+\alpha_3)], \tag{15}$$

and $$I_4 = R_1 I[(1+C_{s2}) + 2\sqrt{C_{s2}} \cos(\phi+\alpha_4)], \tag{16}$$

where, $\alpha_n$ is the known phase shifted for the $n^{th}$ sub-field of interference, the phase $\phi$ of the object beam can be solved by combining the six equations (1), (2), (13), (14), (15), and (16).

Sometimes, getting four images all interfered from proper intensity ratios of object beams to reference beams is difficult, but getting only three images is easier. Therefore, solving the phase $\phi$ of the object beam from only three simultaneously generated interferograms is needed. The light intensity of the three simultaneously generated interferograms can be represented by the equations.

$$I_1 = (I_{R1} + I_{O1}) + 2\sqrt{I_{R1}I_{O1}} \cos(\phi+\beta_1), \tag{17}$$

$$I_2 = (I_{R2} + I_{O2}) + 2\sqrt{I_{R2}I_{O2}} \cos(\phi+\beta_2), \tag{18}$$

and $$I_3 = (I_{R3} + I_{O3}) + 2\sqrt{I_{R3}I_{O3}} \cos(\phi+\beta_3) \tag{19}$$

where, $\beta_n$ is the known phase shifted for the $n^{th}$ sub-field of interference.

Four optical parameters can be defined as $$C_{R1} = \frac{I_{R1}}{I_{R3}}, \quad C_{R2} = \frac{I_{R2}}{I_{R3}}, \quad C_{O1} = \frac{I_{O1}}{I_{O3}}, \text{ and } C_{O2} = \frac{I_{O2}}{I_{O3}}.$$

As $C_{R1}$, $C_{R2}$, $C_{O1}$, and $C_{O2}$ represent the beam-splitting characteristics of an apparatus for simultaneously acquiring interferograms, these four parameters are constant for the same apparatus. FIG. 11 can be used to derive $C_{R1}$, $C_{R2}$, $C_{O1}$, and $C_{O2}$ but the step 345 must be deleted and the step 344 must be modified to calculate $C_{R1}$, $C_{R2}$, $C_{O1}$, and $C_{O2}$. Moreover, FIG. 10 can be used to calculate the phase $\phi$ in the equations (17), (18), and (19), but step 35 must be deleted and step 34 must be modified to calculate $C_{R1}$, $C_{R2}$, $C_{O1}$, and $C_{O2}$.

To sum up, the present invention provides a method and an apparatus for simultaneously acquiring interferograms in a real-time manner, using which, a plurality of interferograms generated from the interference of an object beam and a reference beam with various interference conditions can be obtained and used to solve the phase information of the object beam.

The invention being thus described, it will be obvious that the same may be varied in many ways. Such variations are not to be regarded as departures from the spirit and scope of the invention, and all such modifications as would be obvious to one skilled in the art are intended to be included within the scope of the following claims.

What claimed is:

1. A method for simultaneously generating and acquiring interferograms in a real-time manner, comprising the steps of:
   polarizing a measuring light beam into a polarized beam;
   splitting the polarized beam into a first polarized beam and a second polarized beam;
   forming a reference beam by the use of the first polarized beam;
   projecting the second polarized beam on an object to be measured for forming an object beam;
   making the object beam and the reference beam interfere with each other so as to form at least two interference fields while enabling the phase differences between the object beam and the reference beam of the at least two interference fields to be different from each other;
   dividing the at least two interference fields into a plurality of sub-fields of interference; and
   imaging the plural sub-fields of interference in a single shooting action for acquiring a plurality of interferograms.

2. The method of claim 1, wherein the plural sub-fields of interference are arranged as a one-dimensional array.

3. The method of claim 1, wherein the plural sub-fields of interference are arranged as a two-dimensional array.

4. An apparatus for simultaneously generating and acquiring interferograms in a real-time manner, comprising:
   a light emitting unit, for emitting a measuring light beam;
   a polarizing unit, for polarizing the measuring light beam into a polarized beam;
   an optical module, for splitting the polarized beam into a first polarized beam and a second polarized beam while enabling the first polarized beam to form a reference beam and enabling the second polarized beam to project on an object measured to form an object beam, and for making the object beam and the reference beam interfere with each other to form at least two interference fields while enabling the phase differences between the object beam and the reference beam of the least at two interference fields to be different from each other;
   a polarization beam-splitting unit, for dividing the at least two interference fields into a plurality of sub-fields of interference; and
   an image acquiring unit, for imaging the plural sub-fields of interference in a single shooting action for acquiring a plurality of interferograms.

5. The apparatus of claim 4, wherein the polarization beam-splitting unit is an integrated device composed of two polarization beam splitters.

6. The apparatus of claim 4, wherein the optical module further comprises:
   a beam splitter for:
      splitting the polarized beam into the first polarized beam and the second polarized beam in a non-polarization beam-splitting manner, and
      combining the reference beam and the object beam for enabling the two beams to interfere with each other;
   a phase retardation plate, for converting the first polarized beam into a phase-delayed beam; and
   a reflective mirror, for reflecting the phase-delayed beam to pass through the phase retardation plate and thus form the reference beam.

7. The apparatus of claim 6, wherein the beam splitter is a glass plate.

8. The apparatus of claim 6, wherein the second polarized beam is projected on the object measured and it is reflected, thus forming the object beam.

9. The apparatus of claim 6, wherein the beam splitter further comprises:
   a first beam splitter, being a non-polarization beam splitter capable of splitting the polarized beam into the first polarized beam and the second polarized beam; and
   a second beam splitter, being a non-polarization beam splitter disposed at a position between the phase retardation plate and the first beam splitter, and being used for combining the reference beam and the object beam for enabling the two beams to interfere with each other.

10. The apparatus of claim 9, wherein the second polarized beam is a glass plate.

11. The apparatus of claim 9, wherein the second polarized beam is projected on the object measured and it passes through the object, thus forming the object beam.

12. The apparatus of claim 4, wherein the optical module further comprises:
   a first beam splitter, being a non-polarization beam splitter capable of splitting the polarized beam into the first polarized beam and the second polarized beam;
   a phase retardation plate, for converting the first polarized beam into a phase-delayed beam;
   a reflective mirror, for reflecting the phase-delayed beam so as to form the reference beam; and
   a second beam splitter, being a non-polarization beam splitter, for combining the reference beam and the object beam for enabling the two beams to interfere with each other.

13. The apparatus of claim 12, wherein the second beam splitter is a glass plate.

14. The apparatus of claim 12, wherein the second polarized beam is projected on the object measured and it is reflected, thus forming the object beam.

15. The apparatus of claim 12, wherein the second polarized beam is projected on the object measured and it pass through the object to form the object beam.

16. The apparatus of claim 4, wherein the optical module further comprises:
   a beam splitter, being a non-polarization beam splitter for:
      splitting the polarized beam into the first polarized beam and the second polarized beam; and
      combining the reference beam and the object beam for enabling the two beams to interfere with each other;
   a reflective mirror, for reflecting the first polarized beam so as to form the reference beam.

17. The apparatus of claim 16, wherein the beam splitter is a glass plate.

18. The apparatus of claim 4, wherein the plural sub-fields of interference are arranged as a one-dimensional array.

19. The apparatus of claim 4, wherein the plural sub-fields of interference are arranged as a two-dimensional array.

20. The apparatus of claim 4, further comprising: at least a microscope objective.

* * * * *